United States Patent
Meux et al.

(10) Patent No.: US 9,979,163 B2
(45) Date of Patent: May 22, 2018

(54) BREAKER PANEL

(71) Applicant: CROUZET AUTOMATISMES, Valence (FR)

(72) Inventors: Dominique Meux, Valence (FR); Fabien Ville, Saint-Peray (FR); Jean-Marie Vergnes, Saint Marcel les Valence (FR)

(73) Assignee: Crouzet Automatismes, Valence (FR)

( * ) Notice: Subject to any disclaimer, the term of this patent is extended or adjusted under 35 U.S.C. 154(b) by 147 days.

(21) Appl. No.: 14/879,756

(22) Filed: Oct. 9, 2015

(65) Prior Publication Data

US 2016/0105003 A1 Apr. 14, 2016

(30) Foreign Application Priority Data

Oct. 13, 2014 (FR) ...................................... 14 59795

(51) Int. Cl.
*H02B 1/04* (2006.01)
*H01H 71/02* (2006.01)
*H02B 1/056* (2006.01)

(52) U.S. Cl.
CPC ........... *H02B 1/04* (2013.01); *H01H 71/0207* (2013.01); *H01H 71/0264* (2013.01); *H02B 1/056* (2013.01); *H04Q 2213/069* (2013.01)

(58) Field of Classification Search
None
See application file for complete search history.

(56) References Cited

U.S. PATENT DOCUMENTS

| | | | |
|---|---|---|---|
| 4,012,708 A * | 3/1977 | Goe, Jr. ................. | H01F 27/402 337/205 |
| 4,774,387 A * | 9/1988 | Nicoloso .............. | H01H 33/561 218/143 |
| 5,950,368 A | 9/1999 | Bradford | |
| 6,317,311 B1 * | 11/2001 | Middlehurst .......... | H02B 1/056 361/637 |
| 2010/0296229 A1 * | 11/2010 | Meux ..................... | H02B 1/056 361/605 |
| 2011/0304135 A1 | 12/2011 | Chaize | |
| 2013/0201608 A1 | 8/2013 | Mills et al. | |

FOREIGN PATENT DOCUMENTS

| | | | |
|---|---|---|---|
| EP | 2254207 A1 | 11/2010 | |
| GB | 738163 A | 10/1955 | |
| JP | 2005268037 A | 9/2005 | |
| WO | WO 2013151737 A1 * | 10/2013 | ............... H01H 9/18 |

\* cited by examiner

*Primary Examiner* — Dimary Lopez Cruz
*Assistant Examiner* — Zhengfu Feng
(74) *Attorney, Agent, or Firm* — Banner & Witcoff, Ltd.

(57) ABSTRACT

This breaker panel comprises a plurality of circuit breakers, each circuit breaker having a head comprising
- a frustroconical seal made of an elastomer, this frustroconical seal having a first frustroconical face; and
- a conic frustum made of a material that is harder than the material of the frustroconical seal, this conic frustum having a second frustroconical face;

in which:

the distance, in a plug-in direction, between an upper edge of the first frustroconical face and the shoulder is at least two times smaller than the distance, in the plug-in direction, between the upper and lower edges of the second frustroconical face; and the upper edge of the first frustroconical face is set back, towards the interior of the circuit breaker, relative to the lower edge of the second frustroconical face.

8 Claims, 2 Drawing Sheets

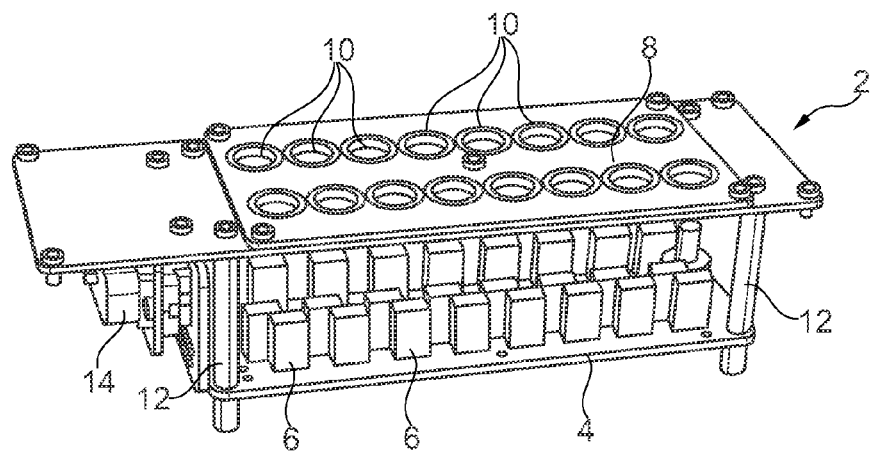
Fig. 1
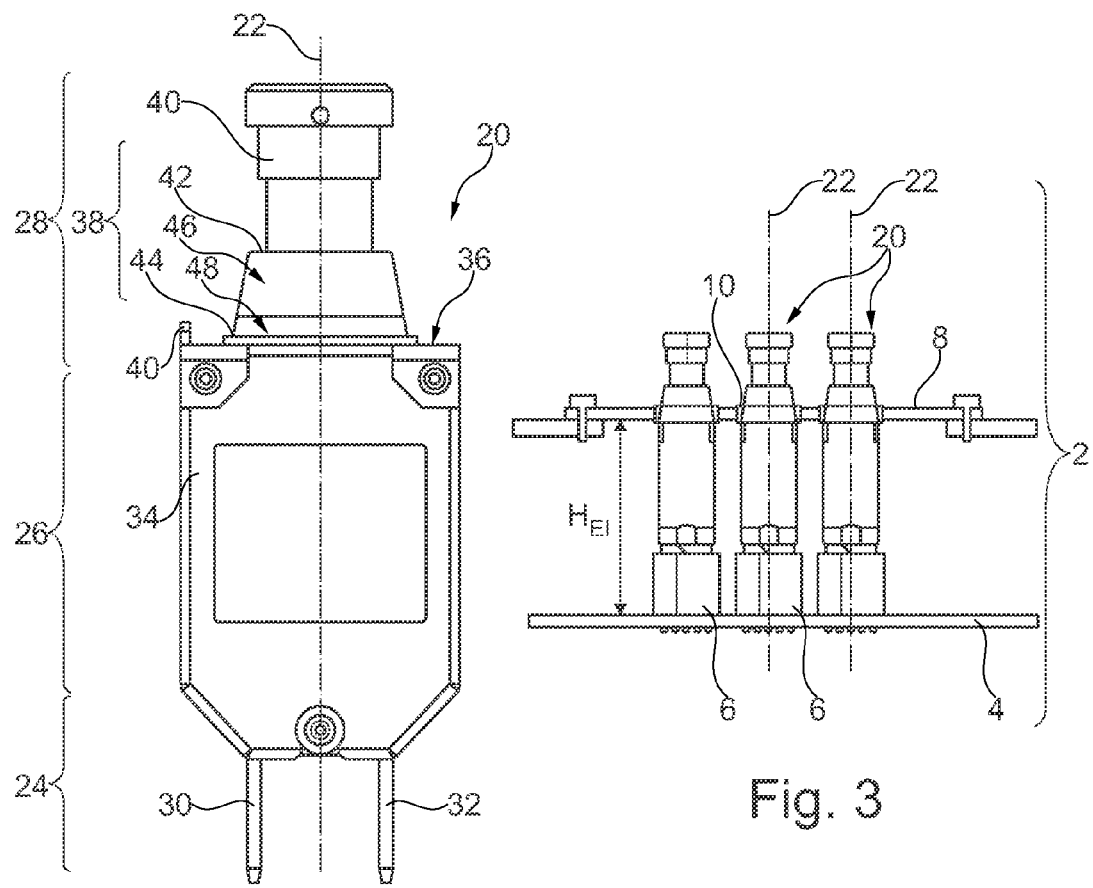
Fig. 2
Fig. 3

BREAKER PANEL

CROSS REFERENCE TO RELATED APPLICATION

This application claims priority to French Patent Application Serial No. 1459795, filed Oct. 13, 2014 which is hereby incorporated by reference in its entirety.

BACKGROUND

The invention relates to a breaker panel and to a circuit breaker and to a seal for this circuit breaker.

Known breaker panels comprise:
a removable front cover comprising apertures; and
 a plurality of circuit breakers, each circuit breaker comprising, at one end, a foot, and at the opposite end, a head received into the interior of a respective aperture of the front cover, this head comprising:
  a frustoconical portion that flares in the direction of the foot, from a top to its base; and
  a shoulder, perpendicular to a plug-in direction, located level with the base of the frustoconical portion,
 the frustoconical portion comprising in immediate succession when traced from its base to its top:
  a frustoconical seal made of an elastomer, this frustoconical seal having a first frustoconical face exposed directly to the exterior and extending from a lower edge to an upper edge; and
  a conic frustum made of a material that is harder than the material of the frustoconical seal, this conic frustum having a second frustoconical face directly exposed to the exterior and extending from a lower edge to an upper edge contained in the top of the frustoconical portion.

Such a breaker panel is disclosed in patent application EP 2 254 207 A1. In such a panel, the seal makes it possible to prevent repeated shocks between the head of the circuit breaker and the edge of the aperture ending in an untimely switching of the circuit breaker.

When a defective circuit breaker is replaced, it is generally not only necessary to replace the circuit breaker but also its seal. However, if the seal is fastened to the aperture and not to the circuit breaker, as described in the embodiment in FIG. 4 of patent application EP 2 254 207 A1, then frequently either it is forgotten to change the seal or the seal is lost.

The embodiment in FIG. 6 of patent application EP 2 254 207 A1 avoids this drawback since the seal is fastened to the head of the circuit breaker. This makes it possible to replace in a single operation both the circuit breaker and the seal. In contrast, with the embodiment in FIG. 6 of patent application EP 2 254 207 A1, it is difficult to mount the front cover on the heads of the circuit breakers. Specifically, the rims of the apertures of the front cover are generally made of metal. During mounting, these rims rub directly against the frustoconical seal, which is made of an elastomer. Given the difference in hardness between the metal edge and the seal, the front cover does not slide easily over the frustoconical portion of the circuit breakers. This makes it very difficult to centre the heads of the circuit breakers in the middle of the apertures especially when the number of circuit breakers is high. Here, the number of circuit breakers is considered to be high when it exceeds ten or fifty circuit breakers. In addition, the rubbing of the metal on the elastomer rapidly wears the frustroconical seals.

SUMMARY

The invention aims to provide a breaker panel having the advantages of the embodiment in FIG. 6 of patent application EP 2 254 207 A1 while making it possible to more easily mount the front cover even when the number of circuit breakers is high.

One subject of the invention is therefore a breaker panel according to claim 1.

In the above embodiment, more than two thirds of the frustoconical portion is formed by the conic frustum made of a material that is harder than the material of the seal. Thus, during mounting of the front cover, the apertures are centred on the heads of the circuit breakers essentially by a frictional interaction between the conic frusta made of harder material and the rims of the apertures. Since the conic frustum is made of a material that is harder than the material of the seals, this centring is facilitated. Specifically, during the centring, the front cover slides easily over the frustoconical faces of the conic frusta of the circuit breakers. In addition, this also limits wear of the frustoconical faces of the seals.

After this initial centring, the apertures of the front cover are already almost perfectly centred relative to the heads of the circuit breakers. Therefore, all that there remains to do is to immobilize the heads of the circuit breakers in the interior of the apertures. To do this, the user pushes the front cover in order to press it against the shoulders of the circuit breakers. It is only at this moment that the rims of the apertures make contact with the frustoconical faces of the seals of the circuit breakers. This contact of the rim of the aperture with the seal is converted, by the frustoconical face, into a holding force and, simultaneously, into a perpendicular radial force. The holding force is parallel to the plug-in direction and immobilizes the circuit breaker in its plugged-in position. The radial force immobilizes the head of the circuit breaker in the centre of the aperture. Thus, the frustoconical face of the seal serves almost on its own to immobilize the circuit breaker in the interior of the aperture. In addition, since the seal is made of a material that is less hard, this immobilization function is fulfilled even if the rim of the aperture does not slide over the frustoconical face of the seal but instead merely deforms it. Thus, by placing the seal uniquely at the base of the frustoconical portion, the advantages of the embodiment in FIG. 6 of patent application EP 2 254 207 A1 are preserved while fitting of the front cover is facilitated. In addition, the above panel preserves the capacity of the seals to immobilize the heads of the circuit breakers at the centre of the apertures.

Embodiments of this panel may comprise one or more of the features of the dependent claims.

These embodiments of the breaker panel furthermore have the following advantages:
 The presence of a washer wedged between the front cover and the shoulder makes it possible to improve the immobilization of the circuit breaker in the plug-in direction.
 The fact that the distance between the lower and upper edges of the seal is larger than the disparity between $Max(H_{Ei})-Min(H_{Ei})$ guarantees that each circuit breaker of the panel will be immobilized in the plug-in direction even if there are slight height differences between these circuit breakers. In other words, the seal then in addition makes it possible to compensate for height differences between various circuit breakers of the panel.

Another subject of the invention is a circuit breaker for the above breaker panel.

Embodiments of this circuit breaker may comprise one or more of the features of the dependent claims.

These embodiments of the circuit breaker furthermore have the following advantages:

The presence of a bead, protruding from an internal face of the seal, received into an indent produced in the circuit breaker, allows the seal to be held in place without needing to use an adhesive.

Lastly, another subject of the invention is a seal, for the above circuit breaker.

BRIEF DESCRIPTION OF THE DRAWINGS

The invention will be better understood on reading the following description, which is given merely by way of nonlimiting example, with reference to the drawings, in which:

FIG. 1 is a schematic perspective illustration of a breaker panel;

FIG. 2 is a schematic illustration of a front view of a circuit breaker for the panel in FIG. 1;

FIG. 3 is a schematic illustration of a side view of the panel in FIG. 1;

In these figures, the same references are used to designate the same elements. In the rest of this description, features and functions that are well known to those skilled in the art are not described in detail.

DETAILED DESCRIPTION

Figures 4, 5:
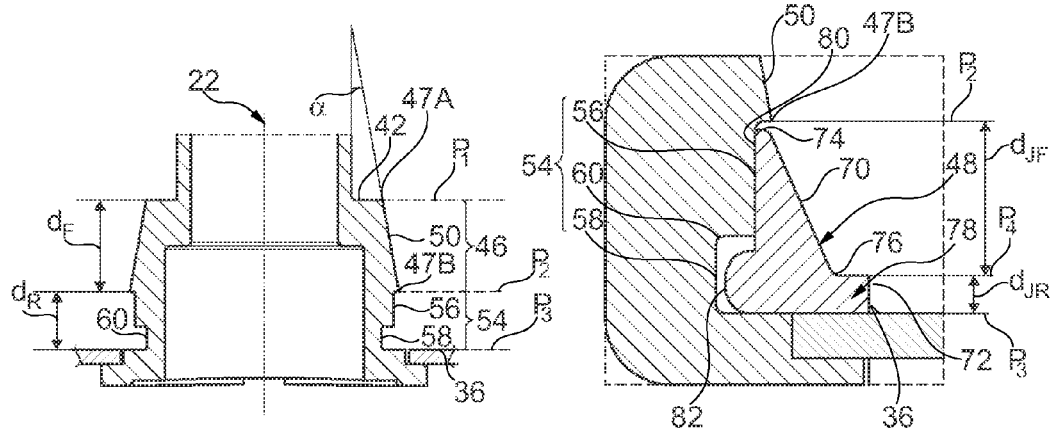
FIG. 4 is a schematic vertical cross-sectional illustration of a conic frustum of the circuit breaker in FIG. 2.
FIG. 5 is a partial schematic vertical cross-sectional illustration of a seal of the circuit breaker in FIG. 2.

FIG. 1 shows a breaker panel 2. The panel 2 is typically intended to be installed in an environment that vibrates, such as the interior of an aeroplane. The function of this panel 2 is to regroup in the same distribution board various circuit breakers of various pieces of electrical equipment. Its architecture is designed so that it is robust with respect, especially, to vibrations.

To simplify FIG. 1, the circuit breakers of the panel 2 have not been shown. This panel 2 comprises:
a substantially rectangular horizontal connecting back board 4;
removable sockets 6 fastened with no degree of freedom to the upper face of the board 4;
a front cover 8 in which apertures 10 for receiving circuit breaker heads are arranged;
spacers 12 located at the four corners of the board 4 in order to fasten with no degree of freedom the cover 8 to this board 4; and
a power connector 14 for connecting the panel 2 to the various pieces of electrical equipment to be protected by the circuit breakers.

Below, the terms "upper", "lower", "up", "down" and similar are defined relative to the vertical direction, i.e. relative to the direction perpendicular to the plane in which the board 4 mainly extends.

The board 4 is typically a printed circuit board. It therefore comprises etched electrical tracks that connect each socket 6 to the connector 14.

Each socket 6 is intended to receive the one or more pins of a respective circuit breaker.

The cover 8 is movable between a mounted position (shown in FIGS. 1 and 3) and a demounted position. In the mounted position, the cover 8 is fastened with no degree of freedom to the upper end of the spacers 12. The lower end of these spacers 12 is fastened with no degree of freedom to the board 4. In this position, the cover 8 holds the circuit breakers plugged into the interior of the sockets 6 by exerting on each of these circuit breakers a vertical force directed towards the board 4. The cover 8 is fastened to the upper ends of the spacers 12 by means of a demountable fastening mechanism, such as bolts and nuts. When the fastening mechanism is demounted, the cover 8 is then in its demounted position. In this demounted position, the circuit breakers may be freely unplugged and removed from the board 4 and, alternately, plugged into the free sockets 6 of the board 4. This especially makes it possible to replace a defective circuit breaker. The cover 8 is made of a hard material and, typically, of metal. The expression "hard material" here designates a material the Young's modulus of which at 25° C. is higher than 1 GPa and, preferably, higher than 10 GPa or 100 GPa.

FIG. 2 shows a circuit breaker 20 intended to be plugged into the sockets 6 of the panel 2. This circuit breaker 20 extends essentially along a vertical axis 22 parallel to the direction in which the circuit breaker 20 is plugged into the sockets 6.

In the upwards direction, along the axis 22, the circuit breaker 20 comprises in succession a foot 24, a body 26 and a head 28.

The foot 24 is able to electrically connect the circuit breaker 20 to the sockets 6. For this purpose, here, the foot 24 comprises two pins 30 and 32 each of which are able to be plugged into a respective socket 6 of the board 4. Specifically, the circuit breaker 20 is removable, along the plug-in direction between a plugged-in position (shown in FIG. 3) and an unplugged position (shown in FIG. 2). In the plugged-in position, the pins 30 and 32 are inserted into the interior of respective sockets 6 so as to electrically connect the circuit breaker 20 to the connector 14 by way of these sockets 6. In the unplugged position, the pins 30 and 32 are mechanically independent of the sockets 6, thereby electrically isolating the circuit breaker 20 from the connector 14.

The body 26 comprises a housing 34 made of a hard electrically insulating material, inside of which are housed the main parts of the circuit breaker 20 for ensuring current switching. Below, the expression "electrically insulating material" here designates a material the resistivity of which at 20° is higher than $10^3$ Ω·m and preferably higher than $10^6$ Ω·m or $10^{10}$ Ω·m.

The head 28 comprises in succession in the upwards direction, along the axis 22: a horizontal shoulder 36, a frustroconical portion 38 and an actuating button 40.

The shoulder 36 extends all the way around the axis 22. It has an upper horizontal bearing face that is oriented upwards. For example, the area of this bearing face is larger than 2 mm$^2$ or 5 mm$^2$ or 1 cm$^2$. This shoulder is intended to bear against the front cover 8 when this cover is in its mounted position in order to hold the foot 24 plugged into the sockets 6. Here, the shoulder 36 also comprises a poka-yoke 40. The poka-yoke 40 is for example a vertical pin able to be received into the interior of a corresponding hole in the cover 8 only when the circuit breaker 20 is correctly positioned in the sockets 6.

The frustroconical portion 38 is moreover intended to centre the head 28 in the interior of an aperture 10 when the cover 8 passes from its demounted position to its mounted position. This frustroconical portion 38 extends between a horizontal top 42 and a horizontal base 44. It comprises in succession in the downwards direction, a conic frustum 46 then a frustroconical seal 48. The top 42 and the base 44 are here circular. The diameter of the top is smaller by at least 1 mm or 2 mm than the diameter K of the aperture 10. The diameter of the base 44 is practically equal to the diameter K. For example, the diameter of the base 44 is strictly smaller than the diameter K and, typically, larger than 0.9K or 0.95K. The frustroconical portion 38 is described in greater detail with reference to FIGS. 4 to 8 below.

The button 40 is located on the top 42 of the frustroconical portion 38. It is movable along the axis 22, directly by hand by a user, between a protruding position and a depressed position. When the button 40 is in its protruding position, the circuit breaker is in an open state. In the open state, the pins 30 and 32 are electrically isolated from each other. In contrast, in the depressed position, the pins 30 and 32 are electrically connected to each other in order to allow current to flow between these two pins and therefore a corresponding piece of electrical equipment to be supplied with power. Here, manually moving the button 40 between these protruding and depressed positions allows this circuit breaker to be manually switched between these open and closed states. The circuit breaker 20 is also able to automatically switch from its close state to its open state if the magnitude of the current flowing through the pins 30 or 32 exceeds a preset threshold. After this automatic switching of the circuit breaker 20 to its open state, the circuit breaker 20 may be rearmed by manually moving the button 40 to its depressed position.

FIG. 3 shows the cover 8 in its mounted position. As may be seen in this figure, in this mounted position, the heads 28 of the circuit breakers each pass through a respective aperture 10. Here, the various circuit breakers of the panel 2 are all considered to be identical. Typically, the panel 2 comprises at least one and, preferably, more than five or ten or thirty or fifty circuit breakers.

FIG. 4 shows in greater detail the frustroconical portion 38 with the conic frustum 46 but devoid of the seal 48. The frustum 46 is produced in a material that is at least two or three times harder than the material used to produce the seal 48. Here, it is a question of a hard material such as a hard plastic or a metal.

The frustum 46 has a frustroconical face 50 exposed directly to the exterior. This face 50 extends continually while flaring from an upper edge 47A, located in a horizontal plane $P_1$, to a lower edge 47B located in a horizontal plane $P_2$. The plane $P_2$ is located below the plane $P_1$. The top 42 of the frustroconical portion 38 is contained in the plane $P_1$. The vertical distance between the planes $P_1$ and $P_2$ is denoted $d_F$. Here, the distance $d_F$ is larger than or equal to 5 mm or 7 mm and, generally, smaller than or equal to 20 mm or 15 mm.

The face 50 is an axisymmetric conic frustum having infinite rotational symmetry about the axis 22. This face 50 makes an angle α to the vertical. This angle α is comprised between 5° and 45° and, preferably, between 10 and 30°.

Immediately beneath the frustum 46, the frustroconical portion 38 contains an annular groove 54 that extends from the plane $P_2$ as far as a horizontal plane $P_3$. The plane $P_3$ contains the shoulder 36. The vertical distance between the planes $P_2$ and $P_3$ is denoted $d_R$.

The groove 54 is intended to receive the seal 48. It has infinite rotational symmetry about the axis 22. Its profile, in a vertical plane containing the axis 22, comprises, in immediate succession when traced downwards, a first flat bottom 56 followed by a second flat bottom 58. The bottoms 56 and 58 are axisymmetric cylinders centred on the axis 22. The bottom 56 is located at a distance from the axis 22 larger than the distance at which the bottom 58 is located. Thus, the bottom 58 forms the bottom of an indent 60.

Figures 6, 7:
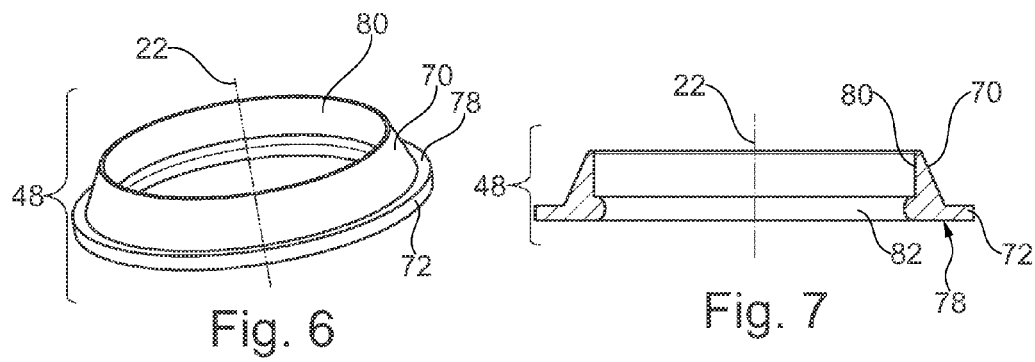
FIG. 6 is a schematic perspective illustration of the seal of the circuit breaker in FIG. 2.
FIG. 7 is a schematic vertical cross-sectional illustration of the seal in FIG. 6.

FIGS. 5 to 7 show the seal 48 in greater detail. More precisely, FIG. 5 shows the seal 48 mounted in the interior of the groove 54 and FIGS. 6 and 7 show this seal 48 located outside of the groove 54. The seal 48 is made entirely of an elastically flexible material that is deformable under the pressure of the cover 8 when the latter is moved towards its mounted position. Typically, the seal 48 is made of a material the Young's modulus of which is lower than 0.1 GPa at 25° C. It typically is a question of a polymer and generally of an elastomer.

The seal 48 comprises an external face exposed directly to the exterior when the seal 48 is received in the interior of the groove 54. This external face comprises a frustroconical face 70 followed, in the downwards direction, by a circular cylindrical face 72.

The frustroconical face 70 extends, while flaring, from an upper edge 74 as far as a lower edge 76 located in a horizontal plane $P_4$. The plane $P_4$ contains the base 44 of the frustroconical portion 38. The vertical distance between the planes $P_2$ and $P_4$ is denoted $d_{JF}$. The distance $d_{JF}$ is at least two or three times smaller than the distance $d_F$. The distance $d_{JF}$ is typically smaller than 3 mm. This distance $d_{JF}$ is also larger than the thickness of the front cover 8 and therefore generally larger than 0.5 mm. Here, this distance $d_{JF}$ is larger than the disparity between $\max(H_{Ei})-\min(H_{Ei})$, where:

$H_{Ei}$ is the height of the circuit breaker between its shoulder 36 and the upper face of the plate 4 when the circuit breaker is in its plugged-in position, the index i being an identifier of this circuit breaker making it possible to identify it among all the other circuit breakers of the panel 2;

Max( . . . ) is the function that returns the largest of the heights $H_{Ei}$ among all the heights $H_{Ei}$ of the circuit breakers of the panel 2; and Min( . . . ) is the function that returns the smallest height $H_{Ei}$ among all the heights $H_{Ei}$ of the circuit breakers of the panel 2.

The distance $H_{Ei}$ is represented in FIG. 3 in the particular case where the latter is the same for the three circuit breakers shown in this figure.

The upper edge 74 is turned towards the plane $P_2$. This edge 74 is located at least 0.5 mm and preferably at least 0.2 mm from this plane $P_2$. In a vertical plane, the frustroconical face 70 is inclined to the vertical direction by an angle β. The angle β is typically equal to the angle α to within plus or minus 10° or 5°.

The cylindrical face 72 is further from the axis 22 than the lower edge 76. Under these conditions, this face 72 corresponds to the vertical face of a washer 78 that extends only between the planes $P_3$ and $P_4$. The lower face of the washer 78 rests directly on the shoulder 36. Thus, the washer 78 is wedged between the cover 8 and the shoulder 36 when this cover 8 is in its mounted position. This makes it easier to compensate for disparities between the various heights $H_{Ei}$ of the various circuit breakers 20 of the panel 2. It is thus possible to guarantee that, in the mounted position, the cover 8 indeed exerts a vertical holding force that immobilizes the circuit breaker 20 in the vertical direction.

The vertical distance between the planes $P_3$ and $P_4$ is here denoted $d_{JR}$. This distance $d_{JR}$ is larger than or equal, for example, to 0.5 mm and generally smaller than or equal to 2 mm or 1.5 mm.

The seal 48 has an internal face turned towards the interior of the groove 54. This internal face comprises in succession in the downwards direction a vertical face 80 then, immediately thereafter, a semi-toroidal-shaped face 82.

The face 80 is an axisymmetric cylinder centred on the axis 22. This face bears directly against the bottom 56 of the groove 54. The distance between the axis 22 and the bottom 56 is adjusted so that the upper edge 74 of the seal 48 is slightly set back, towards the interior of the circuit breaker 20, relative to the lower edge 47B of the frustum 46. For example, the edge 74 is set back from the edge 47B by at least 0.05 mm or 0.1 mm in a horizontal direction. Generally, the distance by which the edge 74 is set back is smaller than 1 mm. Under these conditions, during the mounting of the cover 8, the latter is not able to butt against the upper edge 74. Specifically, this edge 74 is retracted into the interior of the groove 54 and therefore creates no asperity on the frustroconical portion 38. Thus, mounting of the cover 8 is facilitated and in addition wear of the seal 48 is limited.

The face 82 forms a bead that protrudes only into the interior of the indent 60. This makes it possible to retain the seal 48 in place on the circuit breaker 20 without using adhesive. In addition, the volume of the indent 60 is larger than that of the bead so as to leave empty spaces. These empty spaces are filled with the material of the seal 48 when the latter deforms under the effect of the pressure exerted by the cover 8 during mounting. These empty spaces therefore make it possible to limit the deformation, in particular, of the frustroconical face 70.

Figure 8:
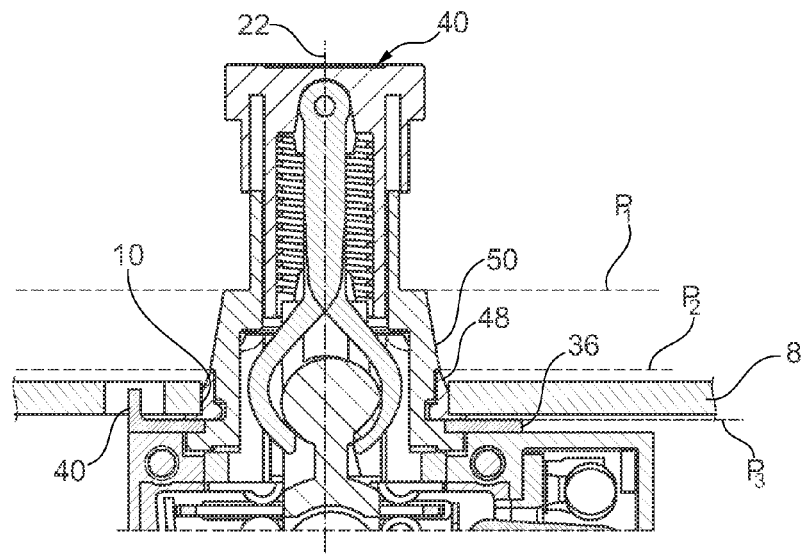
FIG. 8 is a partial schematic vertical cross-sectional illustration of a head of the circuit breaker in FIG. 2.

FIG. 8 shows the frustroconical portion 38 in the case where the cover 8 is in its mounted position. In this position, the rim of the aperture 10 of the cover 8 depresses vertically the frustroconical face 70 of the seal 48. In addition, the cover 8 compresses vertically the washer 78.

During the movement of the cover 8 towards its mounted position, the rim of the aperture 10 first slides over the frustroconical face 50 made of hard material of the frustum 46. This makes it possible to centre, without effort and without wearing the seal 48, the head 38 in the interior of the aperture 10. Once this centring has ended, the rim of the aperture 10 makes contact with the frustroconical face 70 of the seal 48. Given that this face 70 is oblique, the deformation of this face 70 by the cover 8 creates a vertical force that immobilizes the circuit breaker 20 in its plugged-in position and, simultaneously, a horizontal radial force that immobilizes the head 28 in the centre of the aperture 10. In addition, given that the seal 48 is made of a flexible material, the seal 48 prevents direct mechanical shocks between the head 28 and the rim of the aperture 10 and/or the shoulder.

Many other embodiments are possible. For example, as a variant, the directrix curve of the frustroconical portion 38 is not necessarily a circle. It may also be a question of a square or a regular polygon having more than five sides or having three sides.

As a variant, the washer 78 is omitted. In this case, the rim of the aperture 10 may bear directly against the shoulder 36 when the cover 8 is in its mounted position. This makes it possible to improve heat transfer between the circuit breaker 20 and the cover 8.

In another embodiment, the face 82 and therefore the bead are omitted. In this case, the bottom 58 and the indent 60 are also omitted.

In another variant, the edge 74 may be flush with the edge 47B.

The invention claimed is:

1. A breaker panel comprising:
   a removable front cover comprising apertures; and
   a plurality of circuit breakers, each circuit breaker comprising, at one end, a foot, and at the opposite end, a head received into the interior of a respective aperture of the front cover, this head comprising:
   a frustoconical portion that flares in the direction of the foot, from a top to its base; and
   a shoulder, perpendicular to a plug-in direction, located level with the base of the frustoconical portion,
   the frustoconical portion comprising in immediate succession when traced from its base to its top:
   a frustoconical seal made of an elastomer, this frustoconical seal having a first frustoconical face exposed directly to the exterior and extending from a lower edge of the frustoconical seal to an upper edge of the frustoconical seal; and
   a conic frustum made of a material that is harder than the material of the frustoconical seal, this conic frustum having a second frustoconical face directly exposed to the exterior and extending from a lower edge of the conic frustum to an upper edge of the conic frustum contained in the top of the frustoconical portion;
   wherein:
   each circuit breaker includes an indent recessed into the base of the frustoconical portion and the seal comprises an internal face, turned towards the interior of the circuit breaker, this internal face comprising a bead protruding towards the interior of the indent in order to retain the seal on the circuit breaker;
   the lower edge of the conic frustum and the upper edge of the frustoconical seal are adjacent at a common plane;
   the distance, in the plug-in direction, between the upper edge of the first frustoconical face and the shoulder is at least two times smaller than the distance, in the plug-in direction, between the upper and lower edges of the second frustoconical face; and
   the upper edge of the first frustoconical face of the frustoconical seal is set back, towards the interior of the circuit breaker, relative to the lower edge of the second frustoconical face of the conic frustum.

2. The breaker panel according to claim 1, in which:
   the panel comprises a connecting back board equipped with a plurality of sockets;
   each circuit breaker is movable, reversibly and along the plug-in direction, between a plugged-in position in which its foot is plugged into a respective socket of the back board, and an unplugged position in which its foot is electrically isolated from the sockets of the back board; and
   the front cover is movable between:
   a mounted position in which each aperture is passed through by the head of a respective circuit breaker and the perimeter of the aperture bears against the shoulder of this head in order to maintain the circuit breaker in its plugged-in position; and a demounted position in which each circuit breaker may be freely moved towards its unplugged position.

3. The breaker panel according to claim 2, in which the frustoconical seal comprises a washer wedged between the front cover and the shoulder when the front panel is in its mounted position.

4. The breaker panel according to claim 2, in which the distance between the lower and upper edges of the first frustoconical face is larger than or equal to the disparity between max($H_{Ei}$)–min($H_{Ei}$), where:
- $H_{Ei}$ is the distance, in the plug-in direction, between the connecting back board and the shoulder of the circuit breaker in its plugged-in position, and the index "i" is the identifier of this circuit breaker;
- max( . . . ) is the function that returns the largest distance $H_{Ei}$ from the set of distances $H_{Ei}$ of all the circuit breakers in their plugged-in position in the connecting back panel; and
- min( . . . ) is the function that returns the smallest distance $H_{Ei}$ from the set of distances $H_{Ei}$ of all the circuit breakers in their plugged-in position in the connecting back panel.

5. The breaker panel according to claim 1, in which the distance, in the plug-in direction, between the lower and upper edges of the first frustoconical face is larger than or equal to the thickness of the front cover.

6. A circuit breaker for a breaker panel, the circuit breaker comprising, at one end, a foot, and at the opposite end, a head able to be received into the interior of a respective aperture of a front cover of the breaker panel, this head comprising:
- a frustoconical portion that flares in the direction of the foot, from a top to its base; and
- a shoulder, perpendicular to a plug-in direction, located level with the base of the frustoconical portion,
- the frustoconical portion comprising in immediate succession when traced from its base to its top:
  - a frustoconical seal made of an elastomer, this frustoconical seal having a first frustoconical face, exposed directly to the exterior and extending from a lower edge of the frustoconical seal to an upper edge of the frustoconical seal; and
  - a conic frustum made of a material that is harder than the material of the frustoconical seal, this conic frustum having a second frustoconical face, directly exposed to the exterior, extending from a lower edge of the conic frustum to an upper edge of the conic frustum contained in the top of the frustoconical portion;

wherein:
- the circuit breaker includes an indent recessed into the base of the frustoconical portion and the seal comprises an internal face, turned towards the interior of the circuit breaker, this internal face comprising a bead protruding towards the interior of the indent in order to retain the seal on the circuit breaker;
- the lower edge of the conic frustum is adjacent to the upper edge of the frustoconical seal;
- the distance, in the plug-in direction, between the upper edge of the first frustoconical face and the shoulder is at least two times smaller than the distance, in the plug-in direction, between the upper and lower edges of the second frustoconical face; and
- the upper edge of the first frustoconical face is set back, towards the interior of the circuit breaker, relative to the lower edge of the second frustoconical face.

7. The circuit breaker according to claim 6, in which the distance, in the plug-in direction, between the lower and upper edges of the first frustoconical face is smaller than or equal to 3 mm.

8. The circuit breaker according to claim 6, in which this head comprises a button for actuating the circuit breaker, located on top of the frustoconical portion.

* * * * *